United States Patent [19]
Kondo et al.

[11] 3,894,920
[45] July 15, 1975

[54] PROCESS FOR PREPARING ALKYL-SUBSTITUTED 3,6-DIHYDRO-O-DIOXIN DERIVATIVES

[75] Inventors: Kiyosi Kondo, Yamato; Masakatsu Matsumoto, Sagamihara; Miyako Hatsutani, Zushi, all of Japan

[73] Assignee: Sagami Chemical Research Center, Japan

[22] Filed: July 3, 1974

[21] Appl. No.: 485,580

Related U.S. Application Data

[62] Division of Ser. No. 316,504, Dec. 19, 1972, Pat. No. 3,855,246.

[30] Foreign Application Priority Data

Dec. 21, 1971 Japan.............................. 46-10321
July 21, 1972 Japan.............................. 47-72470

[52] U.S. Cl....................... 204/162 R; 204/158 R
[51] Int. Cl................................................ B01j 1/10
[58] Field of Search..................... 204/158 R, 102 R

[56] References Cited
OTHER PUBLICATIONS

Srinivasan, J. Am. Chem. Soc., Vol. 84, pp. 4141 and 4142 (1962) QD1A5.

*Primary Examiner*—Leland A. Sebastian
*Attorney, Agent, or Firm*—Wenderoth, Lind & Ponack

[57] ABSTRACT

Novel process for the preparation of 3,6-dihydro-o-dioxin derivatives comprising photo-sensitized oxygenation of an aliphatic conjugated diene, using a light source of visible ray in the solvent at a temperature of −10° to 70°C. in the presence of a dye photo-sensitizer, and novel alkyl-substituted 3,6-dihydro-o-dioxin derivatives.

5 Claims, No Drawings

PROCESS FOR PREPARING ALKYL-SUBSTITUTED 3,6-DIHYDRO-O-DIOXIN DERIVATIVES

This is a division of application Ser. No. 316,504, filed Dec. 19, 1972, now U.S. Pat. No. 3,855,246.

This invention relates to novel alkyl-substituted 3,6-dihydro-o-dioxin derivatives and a novel process for their preparation.

The novel alkyl-substituted 3,6-dihydro-o-dioxin derivatives of the present invention are alkyl-substituted 3,6-dihydro-o-dioxin derivatives represented by the general formula:

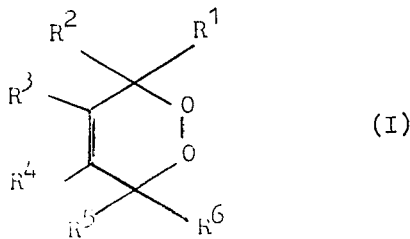

wherein $R^1$, $R^2$, $R^3$, $R^4$, $R^5$ and $R^6$ may be the same or different, and are each a hydrogen atom, an alkyl radical having 1–4 carbon atoms, a phenyl radical, a substituted phenyl radical or a benzyl radical, provided that at least one of $R^1$ to $R^6$ is an alkyl radical or a benzyl radical.

Several processes have hitherto been known as processes for synthesizing o-dioxin compounds of this type, and typical of them are a process for the preparation of ascaridole, etc. by photo-sensitized oxygenation of cyclic conjugated dienes [G. O. Schenck and K. Ziegler, Naturwissenschaften, 32, 157 (1944)] and a process for the preparation of 3,6-diphenyl-3,6-dihydro-o-dioxin by photo-sensitized oxygenation of 1,4-diphenylbutadiene (which is an aliphatic conjugated diene without alkyl substituent) (G. Rio and T. Berthelot, Bull. Soc. Chim. France, 1969, 1664). As for aliphatic conjugated dienes and trienes with alkyl substituents such as myrcene and alloocimene, however, it has long been taught that they do not form dioxin derivatives but form hydroperoxides by photo-sensitized oxygenation. (See, for example, K. Gollnick and G. O. Schenck, "1,4-Cycloaddition Reactions", edited by J. Hamer, Academic Press, New York, 1967, page 255.) Accordingly, it is a matter of common sense for those skilled in the art to assume that hydroperoxides will be formed by photo-sensitized oxygenation of aliphatic conjugated dienes with alkyl substituents.

The present inventors, however, made every effort to produce selectively alkyl-substituted 3,6-dihydro-o-dioxin derivatives represented by said general formula I having useful properties as raw materials in chemical industries, and have succeeded in completing a process for selectively producing said derivatives from alkyl-substituted conjugated diene compounds.

Accordingly, one object of this invention is to provide novel alkyl-substituted 3,6-dihydro-o-dioxin derivatives.

Another object of this invention is to provide a novel process for the preparation of said alkyl-substituted 3,6-dihydro-o-dioxin derivatives.

The other objects of this invention will become clear from the following descriptions.

The present invention provides alkyl-substituted 3,6-dihydro-o-dioxin derivatives represented by said general formula (I), for example, monoalkyl-substituted 3,6-dihydro-o-dioxins such as 4-methyl (or t-butyl)-3,6-dihydro-o-dioxin, dialkyl-substituted 3,6-dihydro-o-dioxins such as 3,6-dimethyl-dihydro-o-dioxin, trialkyl-substituted 3,6-dihydro-o-dioxins such as 3,3,5-trimethyl-3,6-dihydro-o-dioxin, alkyl-substituted 3,6-dihydro-o-dioxins having aryl substituents such as 3,5-dimethyl-3-phenyl-3,6-dihydro-o-dioxin and 3,3-dimethyl-5-phenyl-3,6-dihydro-o-dioxin, and aralkyl-substituted 3,6-dihydro-o-dioxins having aryl substituents such as 3-phenyl-4-benzyl-3,6-dihydro-dioxin.

The 3,6-dihydro-o-dioxin derivatives of the present invention have general utilities as one of organic peroxides. For example, they can be used as radical polymerization initiators, bleaching agents, curling agents, combustion accelerators for heavy oil fuels, etc. They are also useful as intermediates for synthesizing various compounds. For example, dihydrofuran and 1,4-diols can easily be prepared by reducing the compounds of the present invention represented by said general formula I. In particular, 1,4-diol derivatives are useful as raw materials for polyester type polymers, and as raw materials for the production of industrial solvents of cyclic ether type such as tetrahydrofuran. Also, they can be converted into furan derivatives by dehydration, while on the other hand, pyrrole derivatives can be produced with high yield by their reaction with amine type compounds. Since furan ring and pyrrole ring compounds are useful compounds frequently found in nature and having physiological activity, the 3,6-dihydro-o-dioxin compounds of the present invention are especially useful as inexpensive intermediates for the production of these compounds.

The present invention further provides a process for the preparation of alkyl-substituted 3,6-dihydro-o-dioxins represented by the general formula:

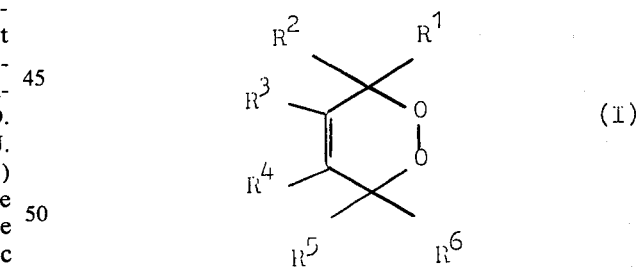

(wherein $R^1$ to $R^6$ have the above-defined meanings) which comprises photo-sensitized oxygenation of an alkyl-substituted aliphatic conjugated diene represented by the general furmula:

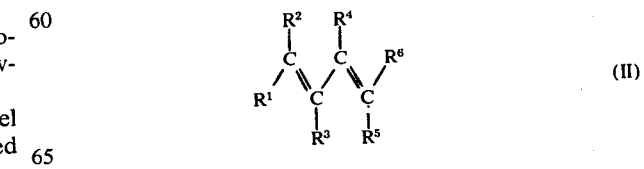

(wherein $R^1$ to $R^6$ have the above-defined meanings) by using a light source of visible rays in a non-aqueous solvent at a temperature of −10° to 70°C. in the presence of a dye photo-sensitizer.

Alkyl-substituted aliphatic conjugated dienes represented by said general formula II are compounds which can be obtained easily. For example, isoprene, 2,4-hexadiene, etc. are present in large amounts in petroleum cracking fractions, and have already been used as industrial raw materials. The other dienes can easily be produced from α,β-unsaturated carbonyl compounds and Grignard compounds, and processes for their preparation have been known widely.

As examples of dye photo-sensitizers used in the process of the present invention, Rose Bengal, Methylene Blue, Eosin, hematoporphyrin, fluorescein and Sulforhodamin B may be mentioned. The reaction is carried out in an inert solvent such as methylene chloride or trichlorofluoromethane. In case of Rose Bengal being used, a mixed solvent consisting of an aprotic solvent such as methylene chloride and a protic solvent such as methanol gives most satisfactory result. At this time, the using ratio of aprotic solvent to protic solvent should preferably be about 10:1 to 30:1 by volume. In case of Methylene Blue being used, aprotic solvents such as methylene chloride are preferred. The other conditions tend to be accompanied by the formation of by-products, and in particular the combination of Methylene Blue and methanol is not preferable, for it causes formation of a large amount of by-products. It has been found, however, that satisfactory result can be obtained in this case, if a large amount of trichlorofluoromethane is used together as a diluent.

The reaction is carried out by dissolving the raw material compound in a solvent in the presence of one of the above-mentioned dye photo-sensitizer, and applying visible rays thereto using an halogen lamp, a sodium lamp, etc. (preferably a halogen lamp) as light source to oxidize it with oxygen or an oxygen supply source such as air. Direct application of ultraviolet rays is not a preferable method, for it causes decomposition of the desired product, nor filtering the ultraviolet rays at the time of application is preferable, for it causes a decrease in the amount of rays applied and prolongs the time for reaction.

The reaction proceeds smoothly at room temperature or below, and the desired product can be selectively produced with high yield and in high purity. The reaction slows down at temperatures below −10°C., whereas some of the raw materials are vapourizable and the operation becomes complicated at temperatures above 70°C., so these temperatures should be avoided.

The present invention will be illustrated below by means of Examples.

EXAMPLE 1

4 g of isoprene was dissolved in 250 ml of trichlorofluoromethane, and then a solution of 50 mg of Rose Bengal in 15 ml of methanol was added thereto. Next, rays from a 650 W iodine lamp were applied to the resultant solution cooled with ice under an oxygen atmosphere. After the irradiation of 4 hours, the trichlorofluoromethane solution was washed with iced water, and dried with magnesium sulfate. On distilling the solvent off under atmospheric pressure and subjecting the remainder to reduced pressure distillation at room temperature, a bad-smelling colourless liquid having a boiling point of 132.0°C. was obtained. From NMR, IR and

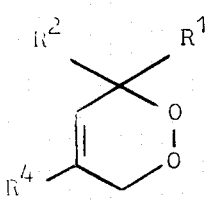

MS spectral data (see Table 1), this product was identified as 4-methyl-3,6-dihydro-o-dioxin.

EXAMPLE 2

The procedure of Example 1 was followed except that 50 mg of Methylene Blue and 5 ml of methanol were used in place of 50 mg of Rose Bengal and 15 ml of methanol, and 4-methyl-3,6-dihydro-o-dioxin was obtained (see Table 1).

EXAMPLES 3–5

2 g each of 2,4-dimethyl-1,3-pentadiene, 4-methyl-2-phenyl-1,3-pentadiene and 2-methyl-4-phenyl-1,3-pentadiene were separately dissolved in 250 ml of methylene chloride, and then each solution was subjected to photo-sensitized oxygenation reaction in the same manner as in Example 1, except that a Methylene Blue solution was used as sensitizer as in Example 2. After the same after-treatment as in Example 1, corresponding 3,6-dihydro-o-dioxin derivatives were obtained as shown in Table 1.

By the way, the 3,6-dihydro-o-dioxin compounds shown in Table 1 are compounds represented by the formula:

Table 1

| Example | $R^1$ | $R^2$ | $R^4$ | b. p. | m. p. | NMR (in $CCl_4$)δppm | IR ($cm^{-1}$) | Yield (%) |
|---|---|---|---|---|---|---|---|---|
| 1 | H | H | $CH_3$ | 132°C | | 1.68(m,3H),4.30(m,2H), 4.40(m,2H),5.60(m,1H) | 1060 1015 | 80 |
| 2 | ditto | | | ditto | | ditto | ditto | 70 |
| 3 | $CH_3$ | $CH_3$ | $CH_3$ | 73°C/ 14 mmHg | | 1.20(s,6H),1.57(m,3H),4.17 (m,2H),5.46(m,1H) | 1063,1015 1005 | 60 |
| 4 | $CH_3$ | $CH_3$ | Ph* | 127°C/ 0.4 mmHg | | 1.30(s,6H),4.56(d,J=13$H_z$, 1H) 4.80(d,J=13$H_z$,1H),6.05(m,1H) 7.10 – 7.30(m,5H) | 1075 1040 1010 | 78 |
| 5 | $CH_3$ | Ph* | $CH_3$ | | 51.5°C– 52.5°C | 1.42(s,3H),1.72(m,3H),4.06 (d of m,J=6.5$H_z$,1H),4.46 (d of m,J=6.5$H_z$,1H),5.90 (m,1H),7.00–7.44(m,5H) | 1076 1030 1012 | 78 |

*Note: Ph stands for phenyl radical.

EXAMPLE 6

3.9 g of 2,4-hexadiene was dissolved in 300 ml of methylene chloride, and then a solution of 100 mg of Rose Bengal in 20 ml of methanol was added thereto. Next, rays from a 300 W iodine lamp were applied to the resultant solution cooled with ice under an oxygen atmosphere. After the irradiation of 7 hours, the methylene chloride solution was washed with an aqueous solution of sodium thiosulfate, and dried with magnesium sulfate. On distilling the solvent off under reduced pressure and subjecting the remainder to reduced pressure distillation, 3 g of 3,6-dimethyl-3,6-dihydro-o-dioxin having a boiling point of 82°C./17 mm Hg was obtained. The yield was 56%. Identification was made by means of NMR and IR.

EXAMPLE 7

The procedure of Example 6 was repeated, except that 2.9 g of 1-phenyl-2-benzyl butadiene was used in place of 2,4-hexadiene and the residual crude product was purified by means of silica gel chromatography, and thus 1,2 g of 3-phenyl-4-benzyl-3,6-dihydro-o-dioxin was obtained as an oily substance. The yield was 61%. The NMR and IR spectral data of this product were as follows:

NMR (in CDCl$_3$) δppm:
4.50(m,2H), 5.48(m,1H),
6.00(broad s, 2H)
7.26(broad s, 5H).
IR $\nu_{C-O}$ (cm$^{-1}$):
1060, 1033, 1002.

EXAMPLE 8

5.0 g of 2-t-butyl-butadiene was dissolved in 100 ml of methylene chloride, and then a solution of 100 mg of Rose Bengal in 20 ml of methanol was added thereto. Next, rays from a 300 W iodine lamp were applied to the resultant solution cooled with ice under an oxygen atmosphere. After the irradiation of 7 hours, the methylene chloride solution was washed with an aqueous solution of sodium thiosulfate, and dried with magnesium sulfate. On distilling the solvent off under reduced pressure and subjecting the remainder to reduced pressure distillation, 4 g of 4-t-butyl-3,6-dihydro-o-dioxin was obtained.

EXAMPLE 9

0.2 g of 4-methyl-3,6-dihydro-o-dioxin produced from isoprene in accordance with the procedure of Example 1 was dissolved in 10 ml of ether, and then reduced with 0.1 g of lithium aluminum hydride. 2-Methyl-cis-2-butene-1,4-diol thus obtained as oily material was mixed with 0.5 g of phenyl isocyanate. Thus, 0.66 g of bis-N-phenyl carbamate of the diol having a melting point of 111°C. was obtained. The yield was 97%.

EXAMPLE 10

0.5 g of 4-t-butyl-3,6-dihydro-o-dioxin was dissolved in 10 ml of anhydrous ether, and reacted with 0.3 g of n-butyllithium. On treating the lithium salt in the reaction mixture with acetic acid and distilling the mixture in the presence of zinc chloride, 3-t-butylfuran having a boiling point of 120°–121°C. was obtained. The yield was 92%.

EXAMPLE 11

0.5 g of 4-methyl-3,6-dihydro-o-dioxin was dissolved in dry triglyme, and then caustic potash was added thereto at room temperature. On dehydrating the reaction product with phosphorus pentoxide, 3-methylfuran having a boiling point of 65°C. was obtained. The yield was 69%.

EXAMPLE 12

0.3 g of 4-methyl-3,6-dihydro-o-dioxin and 0.5 g of aniline were dissolved in ethanol, a catalytic amount of caustic potash was added thereto, and then the resultant solution was refluxed for about 10 hours. Thus, 3-methyl-1-phenylpyrrole having a melting point of 60.5°–61.5°C. was obtained with a yield of 68%.

EXAMPLE 13

The procedure of Example 12 was repeated, except that 0.4 g of 4-t-butyl-3,6-dihydro-o-dioxin was used instead of 0.3 g of 4-methyl-3,6-dihydro-o-dioxin, and thus 3-t-butyl-1-phenylpyrrole was obtained as oily material with a yield of 64%.

IR (liquid film): 3010, 2940, 1600, 1495, 1450, 1358, 1232, 770, 720–710, 690 and 678 cm$^{-1}$.
NMR (CCl$_4$): 1.26 (s, 9H), 6.14 (m, 1H), 6.70–6.90 (m, 2H) and 7.00–7.35 (m, 5H).

EXAMPLE 14

A catalytic amount of caustic potash was added to 0.3 g of 4-t-butyl-3,6-dihydro-o-dioxin, the resultant mixture was refluxed in ethanol, and ammonia gas was blown into the reaction mixture. Thus, 3-t-butyl-pyrrole was obtained with a yield of 93%.

IR (liquid film): 3360, 2930, 1460, 1360, 1065, 1060, 775, 700 and 670 cm$^{-1}$.
NMR (CCl$_4$): 1.23 (s, 9H), 6.02 (m, 1H), 6.40 (m, 2H) and 7.40 (broad s, 1H).

We claim:
1. A process for the preparation of 3,6-dihydro-o-dioxins represented by the formula

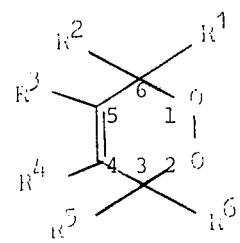

wherein $R^1$, $R^2$, $R^3$, $R^4$, $R^5$ and $R^6$ may be the same or different and are each hydrogen, alkyl having 1 to 4 carbon atoms, phenyl, substituted phenyl or benzyl, provided that at least one of $R^1$ to $R^6$ is alkyl or benzyl which comprises photo-sensitized oxygenation of an aliphatic conjugated diene represented by the formula:

wherein $R^1$ to $R^6$ have the same meanings as defined above, by using a light source of visible rays in a solvent at a temperature of −10° to 70°C. in the presence of a dye photo-sensitizer.

2. The process of claim 1 wherein Rose Bengal is used as dye photo-sensitizer and a mixed solvent consisting of an aprotic solvent and a protic solvent is used as solvent.

3. The process of claim 1 wherein Methylene Blue is used as dye photo-sensitizer and methylene chloride is used as solvent.

4. The process of claim 1 wherein Methylene Blue is used as dye photo-sensitizer and a mixed solvent consisting of trichlorofluoromethane and methanol is used as solvent.

5. The process of claim 2 wherein 10–30 parts by volume of the aprotic solvent is used for one part by volume of the protic solvent.

* * * * *